(12) United States Patent
Frushour (10) Patent No.: US 9,061,264 B2
(45) Date of Patent: Jun. 23, 2015

(54) HIGH ABRASION LOW STRESS PDC

(76) Inventor: Robert H. Frushour, Ann Arbor, MI (US)

( * ) Notice: Subject to any disclaimer, the term of this patent is extended or adjusted under 35 U.S.C. 154(b) by 0 days.

(21) Appl. No.: 13/210,681

(22) Filed: Aug. 16, 2011

(65) Prior Publication Data

US 2012/0291361 A1 Nov. 22, 2012

Related U.S. Application Data

(60) Provisional application No. 61/487,868, filed on May 19, 2011.

(51) Int. Cl.
*B24D 11/00* (2006.01)
*B01J 3/06* (2006.01)

(52) U.S. Cl.
CPC .......... *B01J 3/062* (2013.01); *B01J 2203/0605* (2013.01); *B01J 2203/062* (2013.01); *B01J 2203/0655* (2013.01); *B01J 2203/0685* (2013.01)

(58) Field of Classification Search
None
See application file for complete search history.

(56) References Cited

U.S. PATENT DOCUMENTS

| | | | |
|---|---|---|---|
| 2,216,728 A * | 10/1940 | Benner et al. | 51/298 |
| 2,238,351 A | 4/1941 | Van Der Pyl | |
| 2,941,248 A | 6/1960 | Hall | |
| 3,083,080 A | 3/1963 | Bovenkerk | |
| 3,134,739 A | 5/1964 | Cannon | |
| 3,136,615 A | 6/1964 | Bovenkerk et al. | |
| 3,141,746 A | 7/1964 | De Lai | |
| 3,233,988 A | 2/1966 | Wentorf, Jr. et al. | |
| 3,297,407 A | 1/1967 | Wentorf, Jr. | |
| 3,423,177 A | 1/1969 | Bovenkerk | |
| 3,574,580 A | 4/1971 | Stromberg et al. | |
| 3,745,623 A | 7/1973 | Wentorf, Jr. et al. | |
| 4,034,066 A | 7/1977 | Strong et al. | |
| 4,042,673 A | 8/1977 | Strong | |
| 4,073,380 A | 2/1978 | Strong et al. | |
| 4,108,614 A | 8/1978 | Mitchell | |
| 4,124,690 A | 11/1978 | Strong et al. | |
| 4,151,686 A | 5/1979 | Lee et al. | |
| 4,224,380 A * | 9/1980 | Bovenkerk et al. | 51/307 |
| 4,247,304 A | 1/1981 | Morelock | |
| 4,255,165 A | 3/1981 | Dennis et al. | |
| 4,268,276 A | 5/1981 | Bovenkerk | |
| 4,303,442 A | 12/1981 | Hara et al. | |
| 4,311,490 A | 1/1982 | Bovenkerk et al. | |
| 4,373,593 A | 2/1983 | Phaal et al. | |
| 4,387,287 A | 6/1983 | Marazzi | |

(Continued)

FOREIGN PATENT DOCUMENTS

| EP | 061954 A1 | 12/1980 |
|---|---|---|
| EP | 0300699 A2 | 1/1989 |

(Continued)

*Primary Examiner* — Kaj K Olsen
*Assistant Examiner* — Ross J Christie
(74) *Attorney, Agent, or Firm* — Young, Basile, Hanlon & MacFarlane, P.C.

(57) ABSTRACT

A polycrystalline diamond cutting element for use in rock drilling or other operations that requires very high abrasion resistance with high transverse rupture strength at temperatures above 700 degrees centigrade. The cutting element includes a diamond layer that contains pre-sintered polycrystalline diamond agglomerate (PPDA) bonded to a supporting substrate. The PPDA can be made thermally stable and can be selected to produce a cutting element with any desired abrasion resistance characteristic without affecting internal stress.

17 Claims, 3 Drawing Sheets

(56) References Cited

U.S. PATENT DOCUMENTS

| | | | | |
|---|---|---|---|---|
| 4,412,980 A | | 11/1983 | Tsuji et al. | |
| 4,481,016 A | | 11/1984 | Campbell et al. | |
| 4,486,286 A | | 12/1984 | Lewin et al. | |
| 4,504,519 A | | 3/1985 | Zelez | |
| 4,522,633 A | | 6/1985 | Dyer | |
| 4,525,179 A | | 6/1985 | Gigl | |
| 4,534,773 A | | 8/1985 | Phaal et al. | |
| 4,553,615 A | * | 11/1985 | Grainger | 175/432 |
| 4,556,407 A | | 12/1985 | Fecik et al. | |
| 4,560,014 A | | 12/1985 | Geczy | |
| 4,570,726 A | | 2/1986 | Hall | |
| 4,572,722 A | | 2/1986 | Dyer | |
| 4,604,106 A | | 8/1986 | Hall et al. | |
| 4,605,343 A | | 8/1986 | Hibbs, Jr. et al. | |
| 4,606,738 A | * | 8/1986 | Hayden | 51/295 |
| 4,621,031 A | | 11/1986 | Scruggs | |
| 4,636,253 A | | 1/1987 | Nakai et al. | |
| 4,645,977 A | | 2/1987 | Kurokawa et al. | |
| 4,662,348 A | | 5/1987 | Hall et al. | |
| 4,664,705 A | | 5/1987 | Horton et al. | |
| 4,707,384 A | | 11/1987 | Schachner et al. | |
| 4,726,718 A | | 2/1988 | Meskin et al. | |
| 4,766,040 A | | 8/1988 | Hillert et al. | |
| 4,776,861 A | | 10/1988 | Frushour | |
| 4,792,001 A | | 12/1988 | Zijsling | |
| 4,793,828 A | | 12/1988 | Burnand | |
| 4,797,241 A | | 1/1989 | Peterson et al. | |
| 4,802,539 A | | 2/1989 | Hall et al. | |
| 4,807,402 A | | 2/1989 | Rai | |
| 4,828,582 A | | 5/1989 | Frushour | |
| 4,844,185 A | | 7/1989 | Newton, Jr. et al. | |
| 4,861,350 A | | 8/1989 | Phaal et al. | |
| 4,871,377 A | | 10/1989 | Frushour | |
| 4,883,500 A | * | 11/1989 | Deakins et al. | 51/298 |
| 4,899,922 A | | 2/1990 | Slutz et al. | |
| 4,919,220 A | | 4/1990 | Fuller et al. | |
| 4,940,180 A | | 7/1990 | Martell | |
| 4,943,488 A | | 7/1990 | Sung et al. | |
| 4,944,772 A | | 7/1990 | Cho | |
| 4,976,324 A | | 12/1990 | Tibbitts | |
| 5,011,514 A | * | 4/1991 | Cho et al. | 51/295 |
| 5,027,912 A | | 7/1991 | Juergens | |
| 5,030,276 A | | 7/1991 | Sung et al. | |
| 5,063,333 A | | 11/1991 | Linden-Smith et al. | |
| 5,092,687 A | | 3/1992 | Hall | |
| 5,116,568 A | | 5/1992 | Sung et al. | |
| 5,127,923 A | | 7/1992 | Bunting et al. | |
| 5,133,332 A | | 7/1992 | Tanaka et al. | |
| 5,135,061 A | | 8/1992 | Newton, Jr. | |
| 5,143,523 A | * | 9/1992 | Matarrese | 51/293 |
| 5,173,091 A | * | 12/1992 | Marek | 51/293 |
| 5,176,720 A | | 1/1993 | Martell et al. | |
| 5,186,725 A | | 2/1993 | Martell et al. | |
| 5,199,832 A | | 4/1993 | Meskin et al. | |
| 5,205,684 A | | 4/1993 | Meskin et al. | |
| 5,213,248 A | | 5/1993 | Horton et al. | |
| 5,236,674 A | | 8/1993 | Frushour | |
| 5,238,074 A | | 8/1993 | Tibbitts et al. | |
| 5,244,368 A | | 9/1993 | Frushour | |
| 5,264,283 A | | 11/1993 | Waldenstrom et al. | |
| 5,337,844 A | | 8/1994 | Tibbitts | |
| 5,370,195 A | | 12/1994 | Keshavan et al. | |
| 5,379,853 A | | 1/1995 | Lockwood et al. | |
| 5,405,573 A | * | 4/1995 | Clark et al. | 419/35 |
| 5,439,492 A | | 8/1995 | Anthony et al. | |
| 5,451,430 A | | 9/1995 | Anthony et al. | |
| 5,464,068 A | | 11/1995 | Najafi-Sani | |
| 5,468,268 A | | 11/1995 | Tank et al. | |
| 5,496,638 A | | 3/1996 | Waldenstrom et al. | |
| 5,505,748 A | | 4/1996 | Tank et al. | |
| 5,510,193 A | | 4/1996 | Cerutti et al. | |
| 5,523,121 A | | 6/1996 | Anthony et al. | |
| 5,524,719 A | | 6/1996 | Dennis | |
| 5,560,716 A | | 10/1996 | Tank et al. | |
| 5,607,024 A | | 3/1997 | Keith et al. | |
| 5,620,382 A | | 4/1997 | Cho et al. | |
| 5,624,068 A | | 4/1997 | Waldenstrom et al. | |
| 5,667,028 A | | 9/1997 | Truax et al. | |
| 5,672,395 A | | 9/1997 | Anthony et al. | |
| 5,718,948 A | | 2/1998 | Ederyd et al. | |
| 5,722,499 A | | 3/1998 | Nguyen et al. | |
| 5,776,615 A | | 7/1998 | Wong et al. | |
| 5,833,021 A | | 11/1998 | Mensa-Wilmot et al. | |
| 5,848,348 A | * | 12/1998 | Dennis | 419/5 |
| 5,855,996 A | | 1/1999 | Corrigan et al. | |
| 5,885,149 A | * | 3/1999 | Gillet et al. | 51/298 |
| 5,897,942 A | | 4/1999 | Karner et al. | |
| 5,921,500 A | | 7/1999 | Ellis et al. | |
| 5,954,147 A | | 9/1999 | Overstreet et al. | |
| 5,981,057 A | | 11/1999 | Collins | |
| 6,009,963 A | | 1/2000 | Chaves et al. | |
| 6,011,248 A | * | 1/2000 | Dennis | 219/700 |
| 6,030,595 A | | 2/2000 | Sumiya et al. | |
| 6,050,354 A | | 4/2000 | Pessier et al. | |
| 6,123,612 A | | 9/2000 | Goers | |
| 6,126,741 A | | 10/2000 | Jones et al. | |
| 6,202,770 B1 | | 3/2001 | Jurewicz et al. | |
| 6,248,447 B1 | | 6/2001 | Griffin et al. | |
| 6,269,894 B1 | | 8/2001 | Griffin | |
| 6,298,930 B1 | | 10/2001 | Sinor et al. | |
| 6,344,149 B1 | | 2/2002 | Oles | |
| 6,401,845 B1 | | 6/2002 | Fielder | |
| 6,443,248 B2 | | 9/2002 | Yong et al. | |
| 6,443,249 B2 | | 9/2002 | Beuershausen et al. | |
| 6,447,852 B1 | * | 9/2002 | Gordeev et al. | 427/577 |
| 6,460,631 B2 | | 10/2002 | Dykstra et al. | |
| 6,544,308 B2 | | 4/2003 | Griffin et al. | |
| 6,562,462 B2 | | 5/2003 | Griffin et al. | |
| 6,582,513 B1 | | 6/2003 | Linares et al. | |
| 6,585,064 B2 | | 7/2003 | Griffin et al. | |
| 6,589,640 B2 | | 7/2003 | Griffin et al. | |
| 6,592,985 B2 | | 7/2003 | Griffin et al. | |
| 6,601,662 B2 | | 8/2003 | Matthias et al. | |
| 6,681,098 B2 | | 1/2004 | Pfenninger et al. | |
| 6,739,214 B2 | | 5/2004 | Griffin et al. | |
| 6,749,033 B2 | | 6/2004 | Griffin et al. | |
| 6,797,326 B2 | | 9/2004 | Griffin et al. | |
| 6,811,610 B2 | | 11/2004 | Frushour et al. | |
| 6,846,341 B2 | | 1/2005 | Middlemiss | |
| 6,852,414 B1 | | 2/2005 | Frushour | |
| 6,861,137 B2 | | 3/2005 | Hughes et al. | |
| 6,878,447 B2 | | 4/2005 | Griffin et al. | |
| 7,000,715 B2 | | 2/2006 | Sinor et al. | |
| 7,070,635 B2 | | 7/2006 | Frushour | |
| 7,316,279 B2 | | 1/2008 | Wiseman et al. | |
| 7,493,973 B2 | * | 2/2009 | Keshavan et al. | 175/434 |
| 7,517,588 B2 | | 4/2009 | Frushour | |
| 7,595,110 B2 | | 9/2009 | Frushour | |
| 7,757,791 B2 | | 7/2010 | Belnap et al. | |
| 2004/0247873 A1 | * | 12/2004 | Gordeev et al. | 428/408 |
| 2005/0115744 A1 | | 6/2005 | Griffin et al. | |
| 2008/0115421 A1 | | 5/2008 | Sani | |
| 2008/0223623 A1 | | 9/2008 | Keshavan et al. | |
| 2009/0093198 A1 | * | 4/2009 | Subramanian et al. | 451/246 |
| 2009/0152018 A1 | | 6/2009 | Sani | |
| 2009/0313908 A1 | * | 12/2009 | Zhang et al. | 51/309 |
| 2010/0032036 A1 | | 2/2010 | Basol | |
| 2010/0275523 A1 | * | 11/2010 | Tank | 51/307 |
| 2010/0294571 A1 | * | 11/2010 | Belnap et al. | 51/307 |
| 2010/0307067 A1 | * | 12/2010 | Sigalas et al. | 51/307 |
| 2011/0056141 A1 | * | 3/2011 | Miess et al. | 51/295 |
| 2011/0083908 A1 | | 4/2011 | Shen et al. | |

FOREIGN PATENT DOCUMENTS

| | | |
|---|---|---|
| EP | 0329954 A2 | 8/1989 |
| EP | 0462091 A1 | 12/1991 |
| EP | 0462955 A1 | 12/1991 |
| EP | 0480895 A2 | 4/1992 |
| EP | 0500253 A1 | 8/1992 |
| EP | 0595630 A1 | 5/1994 |
| EP | 0595631 A1 | 5/1994 |
| EP | 0612868 A1 | 8/1994 |
| EP | 0617207 A2 | 9/1994 |

(56) References Cited

FOREIGN PATENT DOCUMENTS

| | | |
|---|---|---|
| EP | 0671482 A1 | 9/1995 |
| EP | 0787820 A2 | 8/1997 |
| EP | 0860515 A1 | 8/1998 |
| EP | 1190791 A2 | 3/2002 |
| EP | 2048927 A2 | 4/2009 |
| GB | 2048927 A | 12/1980 |
| GB | 2261894 A | 6/1993 |
| GB | 2268768 A | 1/1994 |
| GB | 2323110 A | 9/1998 |
| GB | 2323398 A | 9/1998 |
| JP | 59219500 A | 12/1984 |
| WO | 9323204 A1 | 11/1993 |
| WO | 9634131 A1 | 10/1996 |
| WO | 0028106 A1 | 5/2000 |
| WO | 2004022821 A1 | 3/2004 |

* cited by examiner

HIGH ABRASION LOW STRESS PDC

CROSS REFERENCE TO COPENDING APPLICATION

This application claims priority benefit of the U.S. Provisional Application Ser. No. 61/487,868 filed May 19, 2011 in the name of R. Frushour, the entire contents which are incorporated herein by reference.

BACKGROUND OF THE INVENTION

1. Field of the Invention

The present invention relates to a sintered polycrystalline diamond composite for use in rock drilling, machining of wear resistant materials, and other operations which require the high abrasion resistance or wear resistance of a diamond surface. Specifically, this invention relates to such bodies that include a polycrystalline diamond layer attached to a cemented carbide substrate via processing at ultrahigh pressures and temperatures.

2. Description of the Art

It is well known in the art to form a polycrystalline diamond cutting element by sintering diamond particles into a compact using a high pressure, high temperature (HP/HT) press and a suitable catalyst sintering aid. Apparatus and techniques to accomplish the necessary sintering of the diamond particles are disclosed in U.S. Pat. No. 2,941,248 to Hall and U.S. Pat. No. 3,141,746 to DeLai.

U.S. Pat. No. 3,745,623 Wentorf et al. teaches sintering of the diamond mass in conjunction with tungsten carbide to produce a composite compact (PDC) in which the diamond particles are bonded directly to each other and to a cemented carbide substrate.

Diamond compacts and PDC manufactured in accordance with the teachings of DeLai and Wentorf et al. have been limited to low-temperature applications since they show significant thermal damage at temperatures above approximately 750° C. The thermal degradation results in accelerated wear when such compacts are employed in high-temperature applications such as in rock drilling.

A solution to this problem has been proposed in U.S. Pat. No. 5,127,923 to Bunting whereby a diamond cutting element is produced by subjecting a mass of abrasive particles, e.g. diamond or cubic born nitride, to multiple pressure cycles at high temperatures. A solvent-catalyst sintering aid is employed in the initial pressure cycle to form a compact. Depending upon the degree of sintering, the solvent-catalyst can be removed by leaching or other suitable process. During a second pressure cycle, the compact can be bonded to a supporting substrate. In addition, a non-catalyst sintering aid, such as silicon, boron or metals rendered non-catalytic by the addition of silicon or boron which may form strong and chemically-resistant carbides, can be used in the second pressure cycle to enhance the sintering process and create a hard abrasive bonding matrix through out the particle mass.

A problem with this approach is that the polycrystalline diamond layer that is formed during the first high-pressure/high-temperature cycle must be precision ground prior to placing it on top of a substrate for the final high-pressure/high-temperature bonding step. This significantly increases the cost and results in a significantly lower yield than producing PDC in a single step operation. Another disadvantage is the bond between the polycrystalline diamond layer and the substrate is not nearly as strong as that for PDC which is made in a single high pressure cycle whereby individual diamond crystals are bonded to a substrate and to each other. The diamond layer on PDC made by this prior art method often spontaneously delaminates from the substrate before or during use on drill bits or other tools.

Another solution to this problem has been proposed in U.S. Pat. Nos. 6,878,447, 6,861,137, 6.861,098, 6,797,326, 6,739,214, 6,592,985, 6,589,640, 6,562,462 and 6,544,308 to Griffin. This solution provides a cutting element wherein a portion of the diamond table is substantially free of the catalyzing material, and the remaining diamond matrix contains the catalyzing material.

According to these patents, a portion of the diamond table of the PCD element is post-processed so that the interstices among the diamond crystals are substantially free of the catalyzing material. The portion of the diamond table that is substantially free of the catalyzing material is not subject to the thermal degradation encountered in other areas of the diamond body, resulting in improved resistance to thermal degradation. In cutting elements, the processed portion of the diamond body may be a portion of the facing table of the body, a portion of the peripheral surface of the body, or portions of all these surfaces.

A problem with this approach is that it is difficult to leach the catalyst sintering aid if the polycrystalline diamond working surface is highly consolidated with strong diamond to diamond bonding. Typically PDC for rock drilling is made from a blend of diamond with different particle sizes giving an average particle size of less than 25 microns. This results in a dense diamond table and it is very difficult to remove the catalyst. Even with diamond particle sizes as large as 40 microns it can become problematic to remove the catalyst if sintering conditions are such that extensive diamond to diamond bonding reduces the size of the interconnected pore network. To alleviate this problem addition of non-catalytic fillers or lower pressure sintering conditions are necessary in order to create a large enough area of interconnected pores so that acids or other materials can effectively penetrate the diamond network to remove the catalyst. This reduces the impact and abrasion resistance of the finished PDC.

Unlike PDC used in drag bits, cutting elements used in rotary bits to drill rock do not have a sharp cutting edge but must be able to withstand very high impact forces. PDC elements used for this type of bit have a diamond table with a convex dome shape. The PDC elements with a domed shape diamond table are not leached because the leached portion of the diamond results in lower impact resistance for this application. Thus it is generally thought that leaching the catalyst metal from a sintered diamond body does have a negative affect on the low temperature strength of the compact.

Guojlang proposes another solution in US patent application no. 2010/032006 A1. This approach to the problem is similar to that of Bunting whereby the PDC is manufactured in several high-pressure/high-temperature steps. A polycrystalline diamond layer is fabricated without the substrate in the first step is then attached to a substrate via high-pressure/high-temperature bonding in a second step. This patent explains the difficulty that arises in trying to re-infiltrate a previously sintered diamond layer. To enhance the capability of the catalyst metal to infiltrate the pre-sintered layer a number of channels or pathways are designed into the surface of the diamond layer that is to be attached to the substrate. This approach appears to have many of the same problems associated with the Bunting patent.

A significant improvement in the performance of PDC for rock drilling was accomplished by the introduction of a non-planar interface between the polycrystalline diamond layer and the substrate. This is well known in the art and many US and foreign patents have been issued describing numerous patterns for varying the shape of the surface that separates the diamond layer and the substrate. This improvement cannot be realized with PDC made by the methods taught in the Bunting or the Guojlang patents because it is extremely difficult to grind a non-planar diamond surface with close enough tolerances to correctly match the surface of a non-planar substrate. As a result, when one tries to attach a pre-sintered diamond layer to a substrate with a non-planar interface, cracks form in the diamond layer during the second high-pressure/high-temperature cycle. Catalyst metal flows into these cracks and prevents rebonding of the diamond and the resultant strength of the finished PDC cutting element is significantly reduced.

US patent application no. 2011/0083908 A1 to Shen describes a method wherein a first volume consisting of a presintered diamond table is bonded to a second volume of diamond that is either in the form of a presintered diamond table or loose individual single crystal diamonds. By bonding the two diamond bodies together at a lower pressure than that used to presinter the first body stress presumedly is reduced in the PDC. Using a presintered table in the second HPHT step results in the same cracking problems associated with the Bunting and Guojlang patents. If the diamond in the second HPHT step is loose abrasive beneath the first diamond table an uneven force distribution still exists especially with non-planer substrates and cracking of the presintered diamond table persists.

Both Griffin and Shen show presintered diamond pieces imbedded into loose individual single crystal diamonds. The presintered diamond pieces are made at higher pressures then incorporated into the final PDC in a lower pressure bonding cycle. This results in a cutting element with impact and abrasion characteristics determined by the properties of the second matrix. Additionally the second matrix makes it as difficult to remove the catalyst as it is for single matrix cutters.

A PDC cutting element is needed that has densely consolidated diamond with strong bonding, is thermally stable and can be readily manufactured with a non-planar interface between the diamond layer and the substrate if desired.

SUMMARY

There is disclosed a high abrasion low stress polycrystalline diamond cutting element. The polycrystalline diamond cutting element includes a bonding layer attached to a substrate at an interface. The diamond layer is formed of pre-sintered polycrystalline diamond agglomerates that have been previously manufactured by sintering together individual diamond crystals at high pressure and high temperature.

The diamond crystals of the polycrystalline diamond agglomerates (PPDA) are held together by diamond to diamond bonds formed using a catalyst sintering aid. The PPDA agglomerates themselves are also held together by diamond to diamond bonds formed using a catalyst sintering aid.

The PPDA is leached or otherwise treated to render the catalyst sintering aid inactive prior to incorporating the PPDA into a diamond layer bonded to a substrate.

In another aspect, the polycrystalline diamond cutting element has two or more distinctly different subsets with interconnecting pathways between the diamond crystals and the PPDA, both of which are continuous through out the diamond body. At least one subset of interconnecting passage ways is characterized as having more pathways of a smaller size than a number of pathways and the size of the pathways in the at least one other subset.

A method of manufacturing a cutting element comprises the steps of:

attaching a bonded diamond layer to a substrate at an interface;

forming the diamond layer of polycrystalline and diamond agglomerates which have been previously manufactured by a sintering together individual diamond crystals at high pressure and high temperature.

BRIEF DESCRIPTION OF THE DRAWING

The various features, advantages and other uses of the present high abrasion low stress PDC will become more apparent by referring to the following detailed description and drawing in which.

DETAILED DESCRIPTION

In the following description, it should be understood that the composite described hereafter as formed of polycrystalline diamond, PDC, or sintered diamond as it is commonly referred to in the art, can also be made of any of the super hard abrasive materials, including, but not limited to, synthetic or natural diamond, cubic boron nitride, and wurzite boron nitride, as well as combinations there of.

Figure 1:
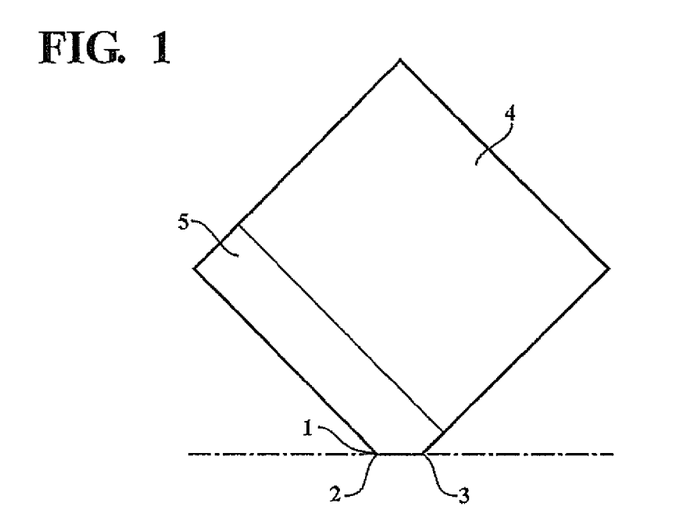
FIG. 1 is a schematic drawing of a PDC cutting rock by a shearing action.

For purposes of this description, a PDC, as shown in FIG. 1, is described as having a facing table 1, a cutting edge 2, a bearing surface 3 and a substrate 4. As the PDC begins to cut, the cutting edge is sharp and the contact area with the rock is small. If the cutting edge of the PDC was leached, the cutting edge 2 remains sharper longer. Eventually, as the edge wears a larger area of the diamond table 3 rubs on the rock generating additional heat. If the heat generated results in temperatures in excess of 750 degrees centigrade in the unleached portion of the diamond table that supports the cutting edge, the diamond table is weakened and with the associated lower transverse rupture strength (TRS), the cutter begins to break down rapidly. If the cutter is to be in service long enough to generate this amount of wear then that portion of the diamond table beneath the cutting edge which rubs on the rock i.e., the bearing surface 3, should also be leached. For cutters that wear until the substrate 4 finally comes in contact with the rock, the depth of the entire diamond table 5 may have to be leached. When leaching the diamond table to care must be taken not to damage the bond with the cobalt layer between the diamond table and the cobalt cemented tungsten carbide substrate.

Figure 2:
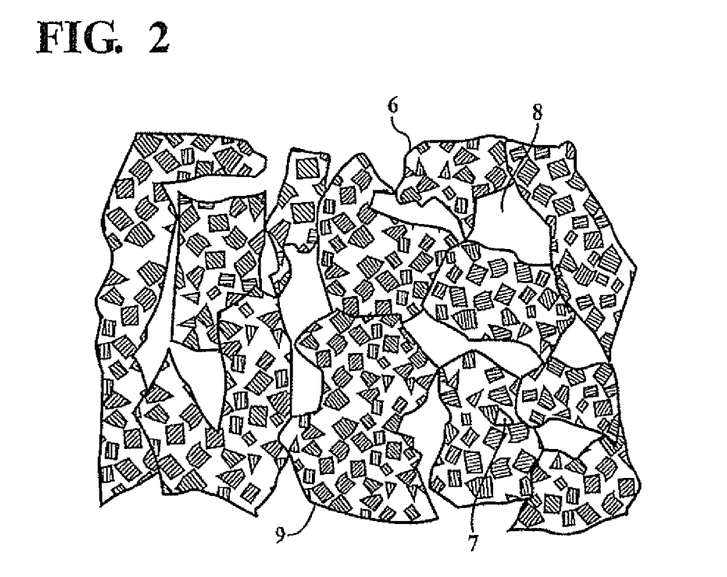
FIG. 2 is a representation of a portion of the diamond table of an inventive PDC showing the two continuous networks of interconnected pores.

PDC cutters made according to the aspects of this invention are somewhat more thermally stable than conventional unleached PDC made by prior art techniques. However, the thermal stability can be further enhanced by releaching the diamond table to any desired depth. FIG. 2 is a representation of a portion of a diamond table made according to aspects of this invention. The diamond table is made from PPDA 6. The PPDA 6 has a branched network of interconnected pores 7 that has smaller openings and a higher density than the network of interconnected channels 8 between the PPDA.

Figure 3:
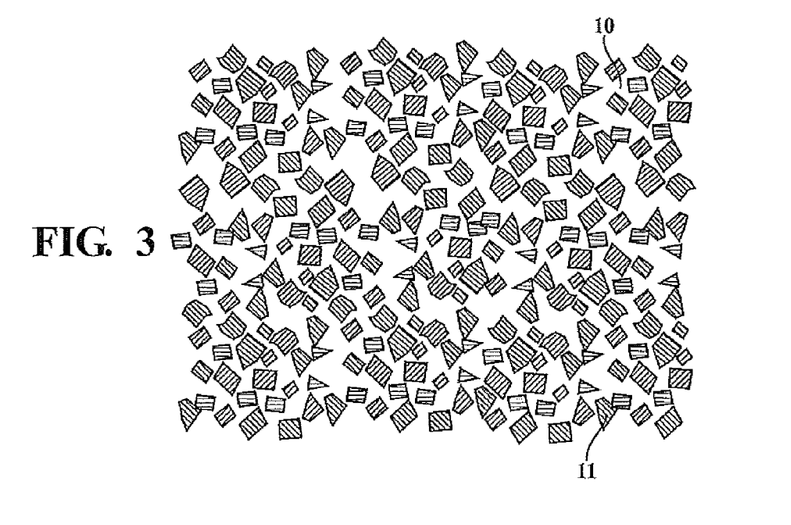
FIG. 3 is a representation of a portion of the diamond table of a conventional PDC made by prior art techniques.

Leaching this diamond table is more rapid and economical than leaching cutters made by prior art since the holes between the PPDA 6 in the interconnected pore network 8 are larger than the holes in the pore network 10 for the prior art PDC of FIG. 3.

Whether or not the cutting element is leached, a PDC made according to this invention which contains two or more independent continuous networks of pores or channels within the diamond body results in a cutting element with physical and chemical properties that can engineered to improve the cutting abilities over that of a PDC made by prior art techniques.

Figure 4:
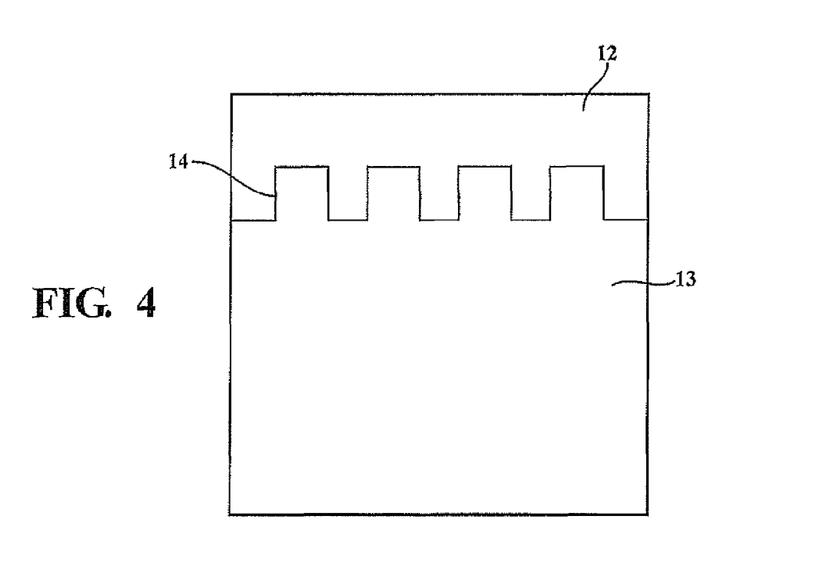
FIG. 4 is a schematic drawing of a PDC with a non-planer interface.

FIG. 4 is a representation of a PDC cutting element that is made according to different aspects of this invention wherein the substrate has a non-planar interface. Substrate 4 is made of a suitable hard metal. Alternately, the substrate can be formed of a carbide formed of at least one metal of group IV, V, VB or VIB.

Figure 5A:
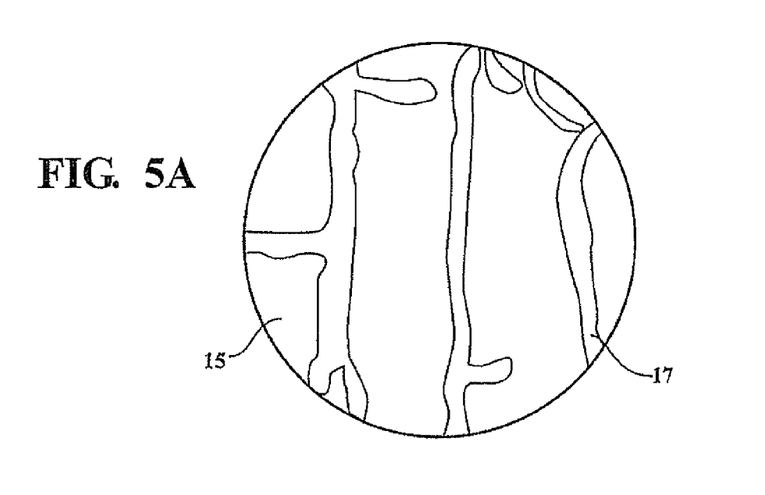
FIGS. 5A and 5B are schematic representations of a PDC with a non-planer interface made in a two step process showing the fractured diamond table.
Figure 5B:
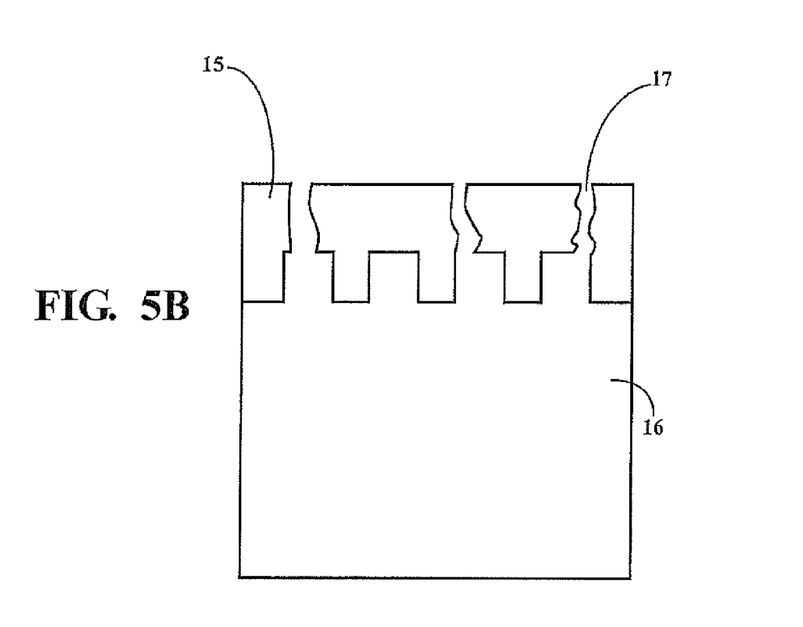

FIGS. 5A and 5B are representations of a PDC cutting element with a non-planar interface between the diamond and the substrate made according to prior art techniques with a pre-sintered diamond table 15. The mismatch in dimensions at the interface between the diamond table 15 and the substrate 16 results in cracks 17 in the diamond table which significantly reduces the overall structural integrity of the cutting element.

A PDC cutter is made from pre-sintered polycrystalline diamond agglomerates (PPDA). The PPDA can be produced in any desired size range and with varying shape characteristics. In addition the individual grain size of the single crystals of diamond and the pressures at which they are subjected to when manufacturing the PPDA can be adjusted to provide a wide range of abrasion characteristics. Generally, the PPDA for this aspect of the PDC cutter ranges in largest dimension size from about 30 microns to about 300 microns or even 500 microns and is itself formed at high-pressure/high-temperature by sintering together individual diamond crystals with an average particle size of less than 30 microns or even less than 15 microns. It is also possible to use individual diamond crystals of an average particle size of less than 10 microns to less than one micron. Although individual diamond crystals of any size can be used to make the PPDA, results indicate that performance improves as the size becomes smaller. Use of PPDA manufactured at pressures higher than that normally used to manufacture the PDC cutting element results in higher abrasion resistance of the diamond layer in the final PDC. This is because when higher pressure sintering conditions are used to manufacture the PPDA significantly stronger diamond to diamond bonding forms between its composite crystals. The PPDA can leached to remove the catalyst sintering aid prior to incorporating it into the final PDC thus providing higher thermal stability to the PDC cutting element.

The different aspects of this invention eliminates problems of re-bonding pre-sintered diamond bodies to a substrate because the size of the PPDA can be readily selected for easy compaction to ensure excellent diamond to diamond contact. This intimate contact provides strong diamond to diamond bonds throughout the structure.

Use of relatively large PPDA as herein in this invention in place of using similar sized single crystal diamond is a huge advantage since large diamond crystals easily cleave or fracture causing rapid wear of the PDC.

The size of the PPDA being larger than its component diamond crystals results in a second network of interconnected pores with a larger hole size than a first network of interconnected pores of smaller hole size in the individual PPDA. This makes it is easier for the catalyst sintering aid to infiltrate the matrix and bond them together. If the size of the PPDA is large enough, the final sintering step can be so rapid that the catalyst does not fully infiltrate into the interior of these agglomerates further increasing the thermal stability of the PDC.

The size of the PPDA and the size of its component crystals can be varied and mixed in any number of ways to produce a PDC with abrasion and impact resistance tailored to meet the needs of a specific application. This is another advantage since any desired high-pressure high-temperature process can be combined with any desired grain size of diamond in the PPDA without affecting the residual internal stress of the PDC. Thus, as previously mentioned, the PPDA may be pressed at very high pressures where it is known that abrasion resistance increases dramatically due to increased diamond to diamond bonding then reassembled on to a substrate at lower pressures and temperatures to give lower residual internal stress.

This results in a cutting element with significantly improved abrasion resistance and, if the sintering aid is absent or inactive at temperatures below 1700 degrees centigrade, improved TRS.

In one aspect, the PPDA is bonded together and to the substrate using a catalyst sintering aid in order to achieve as much diamond to diamond bonding as possible. Non-catalyst sintering aids can be used; however, the bonding strength between the PPDA is reduced and the size of the PPDA becomes of critical importance. With a non-catalyst sintering aid, the size of the PPDA must be at least 350 microns or larger in order to keep the heat generated at the cutting edge from destroying the non diamond to diamond bonds between the PPDA and the sintering aid.

Another significant advantage is that a thermally stable PDC with a non-planar interface as depicted in FIG. 4 can easily be made from previously sintered diamond composite material without creating structural flaws in the diamond table.

There are a number of prior art methods for which diamond composites can be made that are suitable for crushing and further processing into smaller PPDA. U.S. Pat. No. 4,776,861 and U.S. Pat. No. 4,828,582 discloses one method by which polycrystalline diamond abrasive grit can be produced. For a PDC cutting element of this invention it may be desirable to manufacture the PPDA at a higher pressure than that used for polycrystalline diamond grit discussed in these prior patents which would be used for normal abrasive applications such as in grinding wheels. If leaching of the PPDA is to be accomplished it may require stronger acids and or longer times than given in the prior art examples to insure complete removal of the catalyst. This is because of the small particle size of the component diamond crystals and possible higher pressure sintering used to make the PPDA for PDC results in smaller interstices between the component diamond crystals. Removing catalyst from the densely bonded PPDA is however more readily accomplished than for a densely bonded full diamond table as a result of the smaller size and increased surface area of PPDA.

It is significant that the subset of pores in the PPDA can be made free of a catalyst prior to the final high-pressure/high-temperature step. The reason is that if the PPDA is to be leached the smaller interstices within the PPDA that has been re-sintered into a larger diamond body leach at a slower rate than the larger interstices between the PPDA. If not pre-leached the increased time required to fully leach the catalyst within the PPDA may result in excessive leaching between the PPDA to the extent that some of the material that bonds the diamond table to the substrate may be removed. This would result in a reduction of the strength of the bond between the diamond table and the substrate.

The beneficial result of a smaller pore structure within the PPDA is that it is more difficult to re-infiltrate with a catalyst sintering aid such that when these agglomerations are finally sintered into the diamond table of a PDC they retain much of their thermally stable characteristics. To further prevent the re-infiltration of the catalyst sintering and into the pore structure within in the PPDA, the PPDA can be coated or infiltrated with the material which prevents re-infiltration of the catalyst sintering aid use to bond the PPDA together and to attach the grains to a substrate at high pressure and temperature.

One example of a method of producing PPDA is by bonding individual diamond crystals at high-pressure and high-temperature in the presence of cobalt. However, other catalyst may be used, for example iron, nickel, chromium, or the powdery carbonates of Mg, Ca, Sr, and Ba. For a PDC wherein the catalyst is to remain in the diamond body, catalyst that have lower thermal expansion and/or those with higher melting points will naturally result in a PDC with a higher thermal stability. Non-catalytic sintering aids such as silicon can also be used to form the PPDA; although use of such materials as sintering aids generally results in a weaker bonds between the component crystals of the PPDA.

Because the thermal conductivities of polycrystalline diamond with or without the catalyst in the matrix are essentially equal, the temperature in the diamond body will be the same for both at equal distances from the cutting edge. However, the more thermally stable leached cutting edge will remain sharper longer generating less heat and resulting in an overall reduction in temperature for the entire cutting element. Through wear caused by abrasion, the cutting edge eventually dulls and temperatures rise above that required to maintain a strong supporting body for the cutting edge. Above about 700 degrees centigrade, damage is mainly caused by thermal expansion of the metal catalyst overcoming the strength of the diamond to diamond bonds. Weakness is most likely not caused by catalyzed back conversion of diamond to graphite since, for this to occur, the metal catalyst has to melt in order to take the carbon atoms of diamond into solution. For cobalt, this is above about 1350 degrees centigrade. These temperatures may be reached at the cutting edge. In fact, at the cutting edge even higher temperatures may be reached. Above about 1700 degrees centigrade spontaneous back conversion of diamond to graphite without a catalyst being present can occur. This is where use of a catalyst to produce PPDA, such as chromium, platinum, or rhodium, with melting points above 1700 degrees centigrade may be helpful.

If oxygen is present, the carbon atoms of diamond will react to form CO and $CO_2$ at temperatures as low as 700 degrees centigrade. Since leached diamond is porous, damage caused by oxidation may occur more readily than for unleached diamond. Use of catalysts that do not have to be removed from the interconnected poor network would be advantageous in retarding this oxidation. Damage due to oxidation, however proceeds more slowly than that caused by thermal expansion or back conversion of diamond to graphite.

Use of any of the catalyst with higher melting points than cobalt given in the examples above is much more readily accomplished with the embodiments of this invention since the bulk of the diamond single crystals is pre-sintered prior to bonding onto a cobalt cemented tungsten carbide substrate.

Example 1

PPDA is made from a mixture of 80% by weight 10 micron diamond and 20% by weight of 2 micron diamond powder. The mixture is combined with 2% by weight of cobalt powder and placed into a milling apparatus to achieve thorough blending. After blending, the mixture is fired in a furnace at 900° C. in the presence of hydrogen then loaded into molybdenum cups. The loaded cups are placed into a suitable high-pressure/high-temperature cell and pressed to 65 k bar at 1500° C. After 10 minutes, the composite compact is brought to atmospheric pressure and temperature. The diamond compact is removed from the other cell components and then crushed, milled, shape separated and sieved into various mesh size grains. After sieving into selected size ranges, the grains are subjected to nitric and hydrofluoric acid for sufficient time to remove essentially all of the cobalt sintering aid.

PPDA that has been thoroughly leached in the size range having a largest dimension of 50 microns to 100 microns is selected for processing in a second high-pressure/high-temperature step whereby it is sintered together in the presence of a cobalt catalyst and attached to a substrate. For this step, the PPDA is loaded into a molybdenum metal cup. A cobalt cemented tungsten carbide substrate is placed into the cup on top of the PPDA. This assembly is processed in a suitable high-pressure/high-temperature cell for 4 minutes at 52 k bar at a temperature of 1350° C. After pressing, the resulting PDC is recovered from the other cell components and lapped and ground to final dimension. A further processing step to remove the small amount of cobalt that is retained in the interstices between the PPDA near the surface of the diamond table is done by exposing that portion of the PDC to a mixture of nitric and hydrofluoric acid.

Example 2

Polycrystalline diamond grit is made from a mixture of 90% by weight of 15 micron diamond, 5% by weight of five micron diamond and 5% by weight two micron diamond powder. The mixture is combined with 2% by weight of cobalt powder and placed into a milling apparatus to achieve thorough blending. After blending the mixture is fired in a furnace at 900° C. in the presence of hydrogen then loaded into molybdenum cups. The loaded cups are placed into a suitable high-pressure/high-temperature cell and pressed to 62 k bar at 1480° C. After 10 minutes, the composite compact is brought to atmospheric pressure and temperature. The diamond compact is removed from the other cell components and then crushed, milled, shape separated and sieved into various mesh size grains. After sieving into selected size ranges, the grains are subjected to nitric and hydrofluoric acid for sufficient time to remove essentially all of the cobalt sintering aid. PPDA that has been thoroughly leached in the size range having a largest dimension of 100 microns to 200 microns is selected for processing in a second high-pressure/ high-temperature step whereby it is sintered together in the presence of a cobalt catalyst and attached to a substrate. For this step, the PPDA is loaded into a molybdenum metal cup. A cobalt cemented tungsten carbide substrate is placed into the cup on top of the PPDA. This assembly is processed in a suitable high-pressure/high-temperature cell for 4 minutes at 52 k bar at a temperature of 1350° C. After pressing, the resulting PDC is recovered from the other cell components and lapped and ground to final dimension. A further processing step to remove the cobalt that is retained in the interstices between the PPDA of the diamond table is done by exposing that portion of the PDC to a mixture of nitric and hydrofluoric acid. A leach time is selected to remove essentially all of the catalyst in the diamond table to within approximately 200 microns of the cobalt bonding layer between the diamond and the cemented carbide substrate. The result is an essentially completely leached diamond layer firmly bonded to a substrate.

Example 3

A cutting element as described in EXAMPLE 1 is prepared except that a cobalt cemented tungsten carbide substrate with a non-planar interface is chosen. After pressing the PDC shows thorough sintering without cracks in the diamond table and the diamond layer is sufficiently bonded to the substrate.

What is claimed is:

1. A cutting element comprising: a bonded diamond layer attached to a substrate at an interface, wherein the diamond layer is formed of PPDA in the form of bonded polycrystalline diamond agglomerates, each PPDA formed of bonded individual diamond crystals; and the diamond layer having two distinctly different subsets of interconnecting pores between the diamond crystals in each PPDA and between the PPDA, both of which are continuous throughout the diamond layer, one subset of the two subsets of interconnected pores having more pathways of a smaller size than the least number and largest size of pores in the other subset of interconnected pores; and wherein the agglomerate size of the PPDA is larger than 100 microns and the grain size of the individual diamond crystals of the PPDA is smaller than 30 microns.

2. The cutting element of claim 1 wherein the diamond crystals of the PPDA are held together by sintered diamond to diamond bonds.

3. The cutting element of claim 2 wherein the PPDA are held together by sintered diamond to diamond bonds.

4. The cutting element of claim 1 wherein the PPDA are each free of active catalyst sintering aid prior to incorporating the PPDA into a diamond layer bonded to the substrate.

5. The cutting element of claim 4 wherein the PPDA to the substrate bond is a high-pressure and high-temperature sintered bond.

6. The cutting element of claim 5 wherein an outer portion of the diamond layer is free of active catalyst sintering aid in the interstices between the PPDA.

7. The cutting element of claim 6 wherein the diamond layer is free of active catalyst sintering aid in the interstices between the PPDA.

8. The cutting element of claim 1 wherein the PPDA to PPDA bond and the PPDA and to substrate bond are high-pressure high-temperature sintered bond.

9. The cutting element of claim 1 wherein the pathways in an outer portion of the diamond layer are free of or contain inactive catalyst sintering aid in the interstices between the PPDA.

10. The cutting element of claim 1 wherein the average size of the PPDA is larger than 350 microns.

11. The cutting element of claim 7 wherein the sintering aid that is inactive at temperatures below 1700 degrees centigrade.

12. The cutting element of claim 11 wherein the diamond layer is free of active catalyst sintering aid in the interstices between the PPDA.

13. The cutting element of claim 1, wherein the substrate comprises a hard metal.

14. The cutting element of claim 1, wherein the substrate comprises at least one carbide formed of at least one metal of group IV, V, VB or VIB.

15. The cutting element of claim 14, further comprising: a catalyst sinter aid binder formed of at least one of cobalt, nickel, iron and alloys thereof.

16. The cutting element of claim 1, wherein at least one subset of the interconnecting pores is substantially free of a catalyst that reacts with the diamond at temperatures below 2000 degrees centigrade.

17. The cutting element of claim 1, comprising a diamond body consisting of PPDA in the form of bonded polycrystalline diamond agglomerates each formed of high pressure, high temperature sintered individual diamond crystals, wherein the PPDA includes a coating, or the pores between the PPDA are infiltrated with a material preventing re-infiltration of the catalyst sintering aid used to bond the PPDA together and to attach the PPDA to a substrate.

* * * * *